United States Patent [19]
Hatano et al.

[11] Patent Number: 5,919,726
[45] Date of Patent: Jul. 6, 1999

[54] METHOD FOR PRODUCING PHOTOCATALYST MATERIAL

[75] Inventors: Yasuhiro Hatano, Sakai; Hiroki Miyamoto; Kei Miyamoto, both of Nara; Atsushi Kakitsuji, Yao; Toshikazu Nosaka, Izumi; Akira Aoki, Sakai; Tadashi Takatuka; Takeshi Ohara, both of Osaka; Toshiaki Oura, Matsubara, all of Japan

[73] Assignees: Osaka Prefectural Government; Masahiko Takada, both of Osaka-fu, Japan

[21] Appl. No.: 09/055,877

[22] Filed: Apr. 7, 1998

[30] Foreign Application Priority Data

Jan. 30, 1998 [JP] Japan .................................. 10-019604

[51] Int. Cl.$^6$ .......................... B01J 27/135; B01J 21/08; B32B 5/16; C01B 33/12
[52] U.S. Cl. ......................... 502/227; 502/233; 502/236; 502/242; 502/350; 502/527.12; 502/527.15; 428/403; 428/404; 427/419.3; 427/255.3; 516/111; 423/338
[58] Field of Search ................. 502/227, 233, 502/236, 242, 350, 527.12, 527.15; 428/403, 404; 427/226, 248.1, 419.3, 255.3; 516/111; 423/338

[56] References Cited

U.S. PATENT DOCUMENTS

| | | | |
|---|---|---|---|
| 2,344,911 | 3/1944 | Young | 502/236 |
| 3,145,183 | 8/1964 | Fisher | 502/527.15 |
| 3,864,142 | 2/1975 | Kovarik | 252/313 |
| 4,424,320 | 1/1984 | McDaniel | 502/236 |
| 4,482,643 | 11/1984 | Harju et al. | 502/350 |
| 4,904,518 | 2/1990 | Mercer et al. | 428/195 |
| 5,587,349 | 12/1996 | Abe et al. | 502/236 |
| 5,693,134 | 12/1997 | Stephens | 106/415 |
| 5,753,025 | 5/1998 | Bettier et al. | 106/442 |
| 5,753,371 | 5/1998 | Sullivan et al. | 428/406 |
| 5,811,192 | 9/1998 | Takahama et al. | 428/432 |

OTHER PUBLICATIONS

Masakazu Anpo et al: "Photoluminescence and Photocatalytic Activity of Highly Dispersed Titanium Oxide Anchored Onto Porous Vycor Glass", The Journal of Physical Chemistry, vol. 89, No. 23, 1985, pp. 5017–5021 Jun. 1985.

Masakazu Anpo et al: "Photoformation and Structure of $O_2$ and Nitrogen–Containing Anion Radicals Adsorbed on Highly Dispersed Titanium Oxide Anchored Onto Porous Vycor Glass", The Journal of Physical Chemistry, vol. 89, No. 23, 1985, pp. 5689–5694 Jul. 1985.

*Primary Examiner*—Mark L. Bell
*Assistant Examiner*—Patricia L. Hailey
*Attorney, Agent, or Firm*—Nikaido, Marmelstein, Murray & Oram LLP

[57] ABSTRACT

A primary object of the present invention is to easily and securely fix a photocatalyst to a substrate. According to the invention, there is provided a process for preparing a photocatalyst material, the process comprising a first step of forming an undercoating containing silica gel on a substrate, a second step of bringing titanium tetrachloride into contact with the undercoating and a third step of heat-treating the coated substrate.

6 Claims, 4 Drawing Sheets

FIG.4 ial having an average particle size of about 20 to about 50 μm, preferably about 38 to about 44 μm.

METHOD FOR PRODUCING PHOTOCATALYST MATERIAL

FIELD OF THE INVENTION

The present invention relates to a novel process for preparing a photocatalyst material, and more particularly to a process for preparing a photocatalyst material comprising a photocatalyst supported on a substrate.

BACKGROUND OF THE INVENTION

Microbial particles of metal oxides such as titanium oxide, zinc oxide or the like are known to have a photocatalytic activity. These particles have been developed as antibacterial agents, deodorants, antifungal agents or the like. Attempts are under way to put such metal oxides into practical use in various fields.

In recent years, a variety of photocatalyst materials have been developed using fine particles of titanium oxide. For example, photocatalyst materials for removing harmful substances are known, such as those prepared by kneading titanium oxide particles, calcined gypsum and water and curing the mixture (Japanese Unexamined Patent Publication No. 327965/1994); those prepared by coating a substrate with a titanium oxide sol and calcining the coated substrate (Japanese Unexamined Patent Publication No. 278241/1994); and those prepared by coating a substrate with a composition containing titanium oxide particles and a silicon compound, and drying or calcining the coated substrate to fix the titanium oxide particles to the surface of the substrate (Japanese Unexamined Patent Publication No. 164334/1996).

However, the photocatalyst materials prepared by kneading titanium oxide particles, calcined gypsum and the like are defective. Namely, titanium oxide particles are mostly embedded deep into the cured product. In other words, only a small amount of titanium oxide particles is exposed on the surface of the cured product so that a high photocatalytic activity can not be produced even when the surface thereof is forcedly irradiated with ultraviolet beams. Even if titanium oxide particles mostly come out on the substrate, they are likely to come off. When titanium oxide particles are applied to the substrate and calcined, the particles tend to be removed from the substrate.

On the other hand, when the substrate is coated with the composition containing titanium oxide particles and a silicon compound, the titanium oxide particles are at least partly embedded in the coating layer. Consequently the density of titanium oxide particles exposed on the surface is markedly decreased so that a satisfactory photocatalytic activity can not be exhibited. As described above, when the photocatalyst material is directly supported on a substrate as in the prior art, it has been difficult for the photocatalyst material to achieve a high photocatalytic activity.

A process is known which comprises glazing a tile substrate (pottery), spraying the glazed substrate with a liquid containing titanium oxide particles and heat-treating the coated substrate to form a titanium oxide layer on the coated substrate. This process can firmly attach a titanium oxide layer to the substrate so that titanium oxide particles are unlikely to come off or to be removed. However, the process necessitates heat treatment at high temperatures at which the crystalline structure of titanium oxide is changed from anatase-type to rutile-type in which a low photocatalytic activity is achieved.

SUMMARY OF THE INVENTION

A primary object of the present invention is to easily and securely fix a photocatalyst to a substrate. According to the invention, there is provided a process for preparing a photocatalyst material, the process comprising a first step of forming an undercoating containing silica gel on a substrate, a second step of bringing titanium tetrachloride into contact with the undercoating and a third step of heat-treating the coated substrate.

DETAILED DESCRIPTION OF THE INVENTION

According to the process of the invention, an undercoating containing silica gel is formed on a substrate (first step). There is no limitation on the materials of the substrate and its shape. Useful materials include all of metals, cement, clay, sand, gravel, ceramics, plastics, wood, stone, glasses and the like. Useful substrates include commercially available articles produced from these materials, e.g. tiles, wall materials, building materials for exterior coating and the like.

When a silica gel-containing undercoating is formed, the surface of a substrate is preferably cleaned with a conventional organic solvent, surfactant or the like.

The silica gel-containing undercoating (hereinafter referred to simply as "undercoating") contains a silanol group (Si—OH group). The silanol group can be formed by coating a substrate with a mixture of silica gel and water, optionally followed by heat treatment.

The silica gels to be used in this case are not limited and include conventional or commercially available ones. Suitable silica gels are those having an average particle size of about 20 to about 50 μm, preferably about 38 to about 44 μm. The proportions of a silica gel and water are suitably selected according to the materials of substrates used and other factors, and are generally in the range of from 1:100 to 1:2000, preferably from 1:300 to 1:1000.

In the mixture, the silica gel may be partly or entirely dissolved. A solution of silica gel entirely dissolved in water (silica sol) is preferably used in the invention. To dissolve a silica gel in water, a silica gel having a small particle size or one predominantly containing a silanol group may be added to water.

The mixture may contain other components within the range which does not adversely affect the effect of the present invention. It is preferred to avoid use of a sodium component which may change the properties of the undercoating.

The methods of coating the substrate with the mixture are not limited insofar as they are capable of forming an undercoating on the substrate. Conventional coating methods to be employed include, for example, spraying, brushing, dip-coating, spin-coating and the like. The thickness of the undercoating can be selected according to the materials of substrates, purpose of end products and other factors and is usually about 0.05 to about 2 μm, preferably about 0.1 to about 0.7 μm.

Optionally the undercoating applied to the substrate may be dried or heat-treated. The undercoating may be dried by being left or heated. The undercoating can be more firmly joined to the substrate by the heat treatment. The heat treatment conditions can be suitably selected according to the formula of the mixture, the kind of the substrate and the like. Usually the heat treatment is effected in an atmosphere containing oxygen (e.g. in oxygen stream or in air (atmosphere)) at a temperature of about 100 to about 900° C. (preferably about 400 to about 500° C.) for about 3 to about 30 minutes.

In the first step, a water vapor may be positively supplied to the atmosphere. Thereby a silanol group is sufficiently formed on the undercoating, which is then stabilized for advantages in subsequent steps.

In the second step, titanium tetrachloride (TiCl$_4$) is brought into contact with the undercoating. The contacting methods are not limited, and include a method comprising bubbling liquid titanium tetrachloride with oxygen or with dried air, and atomizing or spraying the obtained vapor of titanium tetrachloride. Optionally a water vapor may be sprayed to recover the excess titanium tetrachloride vapor as an aqueous solution after or during the supply of titanium tetrachloride vapor, whereby the vapor of titanium tetrachloride not participating in the reaction can be effectively removed.

It is desirable to pre-heat the undercoating before vapor deposition of titanium tetrachloride. The pre-heating conditions are the same as in the heat treatment at the first step. Consequently, if the heat treatment is conducted in the first step, titanium tetrachloride may be contacted with the undercoating while continuing the heat treatment.

On contact of titanium tetrachloride with the undercoating, the titanium tetrachloride is vapor-deposited on the undercoating. Then, the following reactions mainly occur on the surface of the undercoating.

The vapor-deposited titanium tetrachloride is condensed with the silanol group existing in the undercoating, especially on the surface thereof, thereby liberating HCl and causing the titanium atoms of titanium tetrachloride to bind to the oxygen atoms of silanol group. When the water in the atmosphere reacts with chlorine (—Cl) binding to the titanium atoms, hydrolysis occurs, producing a titania cluster, i.e. a mixture of TiO$_2$, TiO(OH)$_2$, Ti(OH)$_4$ and the like. In this case, when —Si—O—Ti—OH or the like is formed on the surface of the substrate, a new titania cluster is accumulated thereon by the vapor deposition of titanium tetrachloride with the result that the crystals grow into an anatase-type crystalline structure and is given a thickness similar to that of a coherent film, i.e. about 0.4 to about 0.7 μm. While the hydrolysis proceeds well even when water is present only in the air, a water vapor may be positively supplied to the atmosphere in the vapor deposition chamber. Chlorine may partly remain when the operation of the second step is completed.

The amount of titanium tetrachloride to be supplied is suitably selected according to the purpose of the end product and other factors insofar as titanium tetrachloride reacts with part or all of silanol groups in the undercoating. Titanium tetrachloride can be vapor-deposited on the undercoating at a vapor pressure of a little higher than the atmosphere pressure, namely 1.05 to 1.10 kgf/cm$^2$ abs, or even at a lower vapor pressure.

The heat treatment conditions in the third step are not limited, and may be usually in the range of about 150 to about 500° C., preferably 400 to 500° C. in an oxygen-containing atmosphere, e.g. in oxygen stream or in air or in the atmosphere, for about 1 to about 10 minutes. The heat treatment in the third step induces hydrolysis with the water present in the atmosphere, liberating HCl while the hydroxyl group binding to titanium atoms releases water, thereby giving titanium oxide. Generally the obtained titanium oxide has an anatase-type crystalline structure. The remaining unreacted chlorine atoms are forcedly replaced with oxygen.

While the hydrolysis sufficiently proceeds with only the water held in the air, a water vapor may be positively supplied to the atmosphere. After the operation of the third step, chlorine may remain in the titanium oxide layer within the range which does not adversely affect the effect of the invention.

In the producing process of the invention, optionally the operations of steps may be individually repeated at least twice. For example, after executing the first step once, the operation of the second step may be repeated twice and the operation of the third step may be repeated three times. Further, for example, after the operation of the third step, the continuous operation of the second and third steps may be repeated at least once. As a result of repetition of steps, the titanium oxide layer may be laminated to produce two or three superposed layers. Thus the amount of titanium oxide to be supported on the substrate can be suitably increased according to the desired purpose and other factors.

Figure 1:
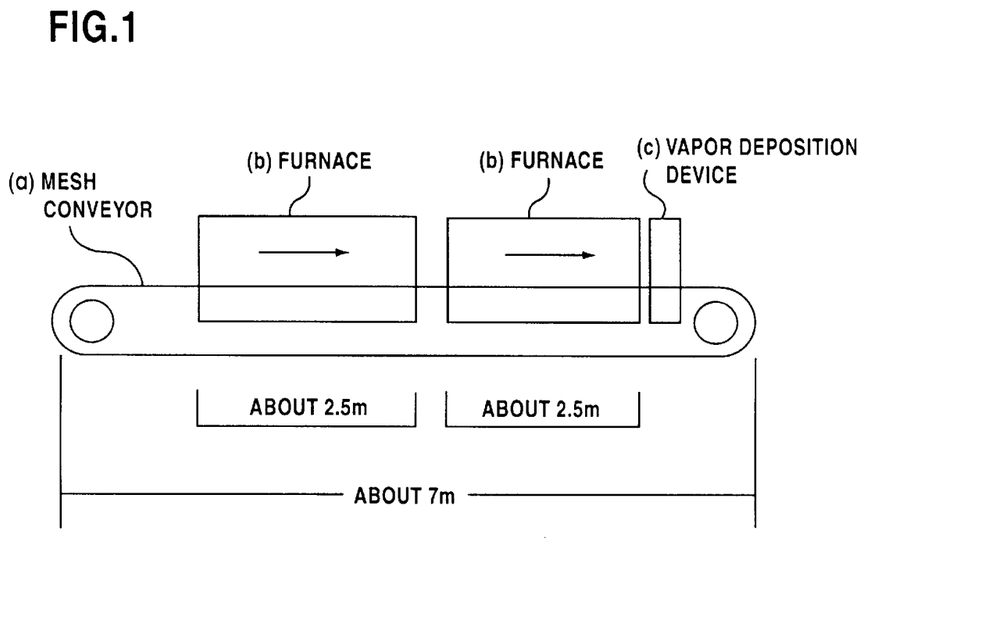
FIG. 1 is a schematic diagram showing an example of a furnace to be used in the producing process of the invention.

The producing process of the invention can be carried out, for example, using the furnace shown in FIG. 1. For example, tiles with an undercoating formed are placed on a mesh conveyor (a) and are introduced into one or more furnaces (b) continuously arranged. After heat treatment, titanium tetrachloride is vapor-deposited on the undercoating for contact therewith in a vapor deposition chamber. A vapor deposition device (c) may be placed in the neighborhood of the furnace to spray the vapor of titanium tetrachloride. Optionally a device for spraying a water vapor (arrow in a downward direction) may be arranged in the vicinity of the furnace and the vapor deposition device as shown in FIG. 1 or may be laid in the interior of the furnace. The operation time in each step can be suitably adjusted according to the travelling rate of the mesh conveyor and the like.

After the formation of silica gel-containing undercoating on the substrate such as tiles, the deposited titanium tetrachloride is reacted with the silanol group, whereby Ti ions are joined mainly to the surface of undercoating and a titanium oxide layer is finally formed as a catalyst layer. According to this technique, the titanium oxide is supported as uniformly dispersed on the substrate unlike the conventional dipping method.

When irradiated with ultraviolet beams from a source of light such as fluorescent lighting or the like, the catalyst layer is excited, thereby causing electrons to become dislodged from holes. The excitation of the catalyst layer results in destruction or elimination of putrefactive bacteria and pathogenic bacteria existing in the air and then falling on the substrate due to their reducing power and oxidizing ability and leads to decomposition of gases in contact with the substrate.

According to the process of the invention, the photocatalyst can be easily and securely fixed to the substrate. In other words, an undercoating is formed between the substrate and the titanium oxide layer, whereby the titanium oxide layer can be effectively attached to the substrate while the photocatalytic activity of the titanium oxide layer is maintained.

In the process of the invention, titanium tetrachloride cheaper than titanium oxide can be used as the raw material and can be easily vapor-deposited on the substrate. Therefore the process of the invention is advantageous in terms of costs compared with conventional processes. Further beneficially, a titanium oxide layer can be laminated on the substrate, for example, by conducting second and third steps repeatedly, whereby a photocatalyst material having a higher photocatalytic activity can be easily produced.

Furthermore, according to the invention the titanium oxide layer can be formed by heat treatment at a relatively low temperature, an anatase-type crystalline structure can be formed in which a higher photocatalytic activity can be exhibited than in a rutile-type crystalline structure.

Moreover, an undercoating predominantly containing silica gel is interposed between the substrate and the titanium oxide layer. Because of this feature, sodium ions and like metal ions are prevented from dissolving out from the substrate, e.g. a tile (pottery), whereby the undercoating or titanium oxide layer is kept from the change of properties which might occur due to these ions.

The photocatalyst material of the invention can exhibit a high photocatalytic activity, and can effectively convert gases such as nitrogen oxide, sulfur oxide, carbon oxide and the like or can effectively destroy bacteria such as *Escherichia col, Staphylococcus aureus* or *Klebsiella pneumoniae*.

A titanium oxide layer can be chemically fixed to the substrate according to the invention unlike the prior art wherein titanium oxide particles are physically supported on the substrate. Thus, the titanium oxide is unlikely to come off or to be removed.

Further, a titanium oxide layer can be formed as a coherent film depending on the substrate selected in the process of the invention. Therefore, the photocatalyst material of the invention is excellent in appearance. In addition, the coherent film can be suitably varied in colors or made colorless according to the production conditions.

In preparing the photocatalyst materials of the invention, the titanium oxide layer can be laminated to give a mar-resistant, hard surface to the photocatalyst material. Moreover, the surface of photocatalyst materials is also superior in hydrophilicity and water resistance. Consequently the photocatalyst materials of the invention can be effectively used in applications which require the use thereof under rigorous conditions, such as building materials for external walls.

As described above, the photocatalyst materials produced in the invention can be widely used in various applications, for example, as antibacterial agents, antifungal agents, deodorants, antifouling agents or the like according to the combination with a variety of substrates. Specific examples are wall materials, molding materials, containers and the like. Typical examples of wall materials are tiles for kitchens, toilet facilities or baths; panels; external wall materials and the like. Sand particles or gravel particles coated with the photocatalyst materials of the invention can be used as materials for pets and for sand pits.

EXAMPLES

Examples are given below to describe in more detail the features of the photocatalyst materials of the invention. In the Examples, the vapor of titanium tetrachloride was deposited in about 2 seconds at a vapor pressure of 1.05 kgf/cm$^2$ abs and at an atmosphere temperature of about 500° C.

Example 1

About 2.7 g of 375-mesh silica gel particles (mean particle size about 40 $\mu$m) were mixed with 1 liter of distilled water. The liquid was applied to the surface of a white tile (commercially available one, 97 mm×97 mm×5 mm (thickness)), using a gauze impregnated with the liquid. The tile was cleaned before application of the liquid to the substrate to remove the oil and the like from its surface. The coated tile was placed into a furnace and heated at 500° C. for 3 minutes to form an undercoating (first step).

Then, the tile was pre-heated at 500° C. in an air stream within the furnace. Liquid titanium tetrachloride was bubbled with oxygen and the obtained vapor of titanium tetrachloride was deposited on the undercoating (second step). After vapor deposition, the tile was sprayed with a water vapor. The vapor deposition including the pre-heating required 80 seconds.

Finally the coated tile was heat-treated at 500° C. for 7 minutes in an oxygen stream within the furnace and further heat-treated under the same conditions to produce a tile having a coherent layer of titanium oxide (third step).

Figure 2:
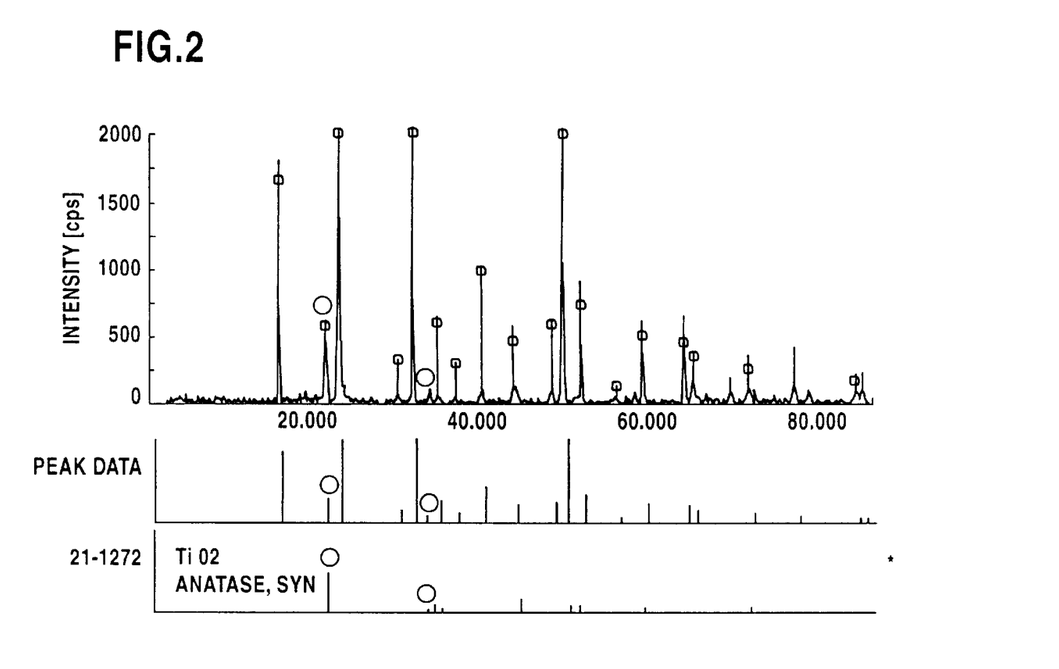
FIG. 2 is a chart showing the results of analyzing the titanium oxide layer obtained in Example 1 by X-ray diffraction.

The obtained tile was analyzed by X-ray diffraction. The analysis showed that the titanium oxide layer had an anatase-type crystalline structure (marked ◯ in FIG. 2).

Example 2

Using the tile obtained in Example 1, the operations of the same second and third steps as in Example 1 were repeated once to produce a tile having a coherent layer of titanium oxide.

Example 3

Using the tile obtained in Example 2, the operations of the same second and third steps as in Example 1 were repeated once to produce a tile having a coherent layer of titanium oxide.

Example 4

Using the tile obtained in Example 3, the operations of the same second and third steps as in Example 1 were repeated once to produce a tile having a coherent layer of titanium oxide.

Example 5

Using the tile obtained in Example 4, the operations of the same second and third steps as in Example 1 were repeated once to produce a tile having a coherent layer of titanium oxide.

Test Example 1

The tiles prepared in Examples 1–5 were tested for the ability to reduce the concentration of nitrogen monoxide (NO).

Figure 3:
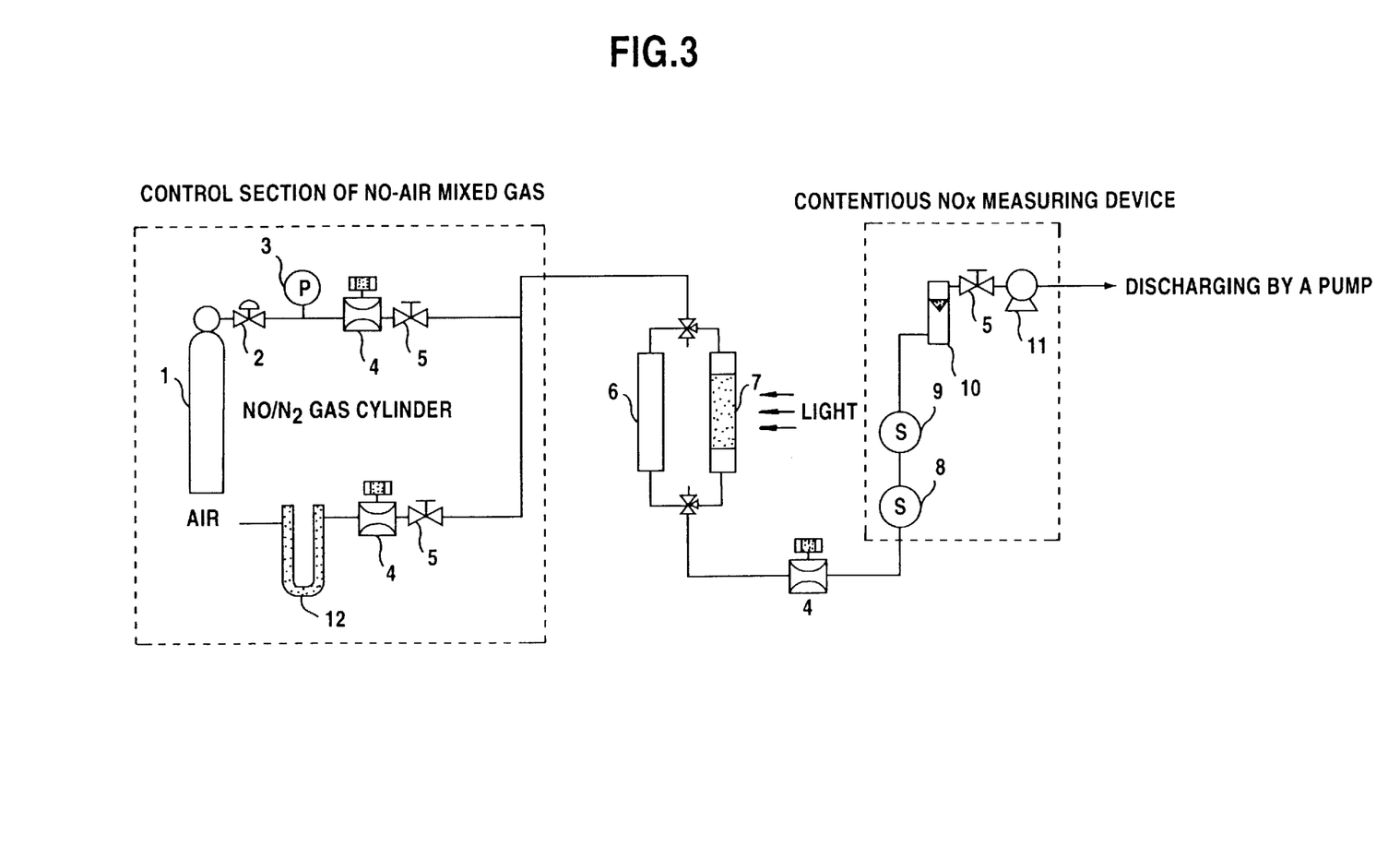
FIG. 3 is a schematic view of a continuous-type apparatus for measuring the NO absorption used in Test Example 1.

The test was conducted using a continuous-type apparatus for measuring the NO absorption shown in FIG. 3. The apparatus illustrated in FIG. 3 comprises a gas cylinder (1), a pressure controller (2), a pressure meter (3), a mass flow sensor (4), a flow control valve (5), an empty Petri dish (6), a photocatalyst material-carrying Petri dish (7), a controlled potential electrolysis-type NO sensor (8), a controlled potential electrolysis-type $NO_2$ sensor (9), a volume flow meter (10), a diaphragm pump (11) and a filter (12).

In the apparatus, a gas supply source comprises the gas cylinder (1) filled with a reference gas (178 ppm $NO/N_2$) and the filter (12) (without a desiccant) for introducing the air. The gas was passed through the empty Petri dish (6) for the adjustment of flow rate, the photocatalyst material-carrying Petri dish (7), the controlled potential electrolysis-type NO sensor (8) and the controlled potential electrolysis-type $NO_2$ sensor (9). The photocatalyst material-carrying Petri dish (7) was one made of Pyrex glass (152 mm in internal diameter, 40 mm in internal height and 2 mm in thickness) and held a predetermined amount of a sample. The dish was set 10 mm away from the center of a black light (20 W) vessel serving as a light source. In the test, the gas (room temperature) was passed in the concentration and at the flow rate shown in Table 1, 30 seconds after irradiating the Petri dish with light (without permitting the gas to pass through the empty Petri dish during the test). The concentration of NO in the gas after the passage through the Petri dish was measured with the controlled potential electrolysis-type NO sensor and the controlled potential electrolysis-type $NO_2$ sensor. The results are shown in Table 1.

TABLE 1

| | Initial conc. of NO (ppm/air) | Flow rate of NO (ml/air) | Measured value of NO (ppm/air) | Reduction rate of NO conc. (%) |
|---|---|---|---|---|
| Example 1 | 1.10 | 240 | 0.875 | 21.5 |
| Example 2 | 1.10 | 240 | 0.750 | 31.8 |
| Example 3 | 1.18 | 242 | 0.625 | 46.8 |
| Example 4 | 1.25 | 240 | 0.625 | 50.0 |
| Example 5 | 1.30 | 234 | 0.400 | 69.3 |

As shown in Table 1, the concentration of NO can be reduced by the photocatalyst material of the invention. Table 1 also shows that a higher effect can be produced by the photocatalyst having at least two laminated photocatalyst layers.

Test Example 2

The tile prepared in Example 5 was tested for the hardness. The test was conducted according to JIS K 5400 (1990), 8.4.1. The tile was scratched with 9H pencil and was observed (×80 magnification). No scratch was found on the tile.

Example 6

Ten grams of 375-mesh silica gel particles (mean particle size about 40 μm) were mixed with 1 liter of distilled water. The liquid was applied to the surface of a white tile (commercially available one, 97 mm×97 mm×5 mm (thickness)), using a gauze impregnated with the liquid. The tile was cleaned before application of the liquid to remove the oil and the like from its surface.

Then, the tile was pre-heated at 500° C. in an air stream within the furnace. Liquid titanium tetrachloride was bubbled with oxygen and the obtained vapor of titanium tetrachloride was deposited on the tile. Thereafter the same vapor deposition operation was repeated once (vapor deposition step). The vapor deposition including the pre-heating was completed in 80 seconds. After vapor deposition, the tile was sprayed with a water vapor.

Finally the coated tile was heat-treated at 500° C. for 7 minutes in an oxygen stream within the furnace. The heat treatment operation was repeated twice under the same conditions to produce a tile having a coherent layer of titanium oxide (heat treatment step). The obtained tile had a rainbow color comprising pink, reddish purple and other colors and was excellent in gloss.

Example 7

A tile having a coherent layer of titanium oxide was prepared in the same manner as in Example 6 except that prior to vapor deposition, the tile was heated at 500° for 3 minutes to form an undercoating.

Example 8

A tile having a coherent layer of titanium oxide was prepared in the same manner as in Example 6 except that prior to vapor deposition, the tile was heated at 600° for 3 minutes to form an undercoating.

Example 9

A tile having a coherent layer of titanium oxide was prepared in the same manner as in Example 6 except that prior to vapor deposition, the tile was heated at 700° for 3 minutes to form an undercoating.

Example 10

A tile having a coherent layer of titanium oxide was prepared in the same manner as in Example 6 except that prior to vapor deposition, the tile was heated at 800° for 3 minutes to form an undercoating.

Example 11

A tile having a coherent layer of titanium oxide was prepared from the tile prepared in Example 7 in the same manner as in Example 7 except that the vapor deposition step and heat treatment step were conducted once.

Example 12

A tile having a coherent layer of titanium oxide was prepared from the tile prepared in Example 9 in the same manner as in Example 9 except that the vapor deposition step and heat treatment step were conducted once.

Test Example 3

The titles prepared in Examples 6–12 were tested for an antibacterial activity by a cell suspension dropping method. The cell suspension (0.5 ml) was dropped onto the tile. After the tile was placed onto a Petri dish, the dish was covered with a lid of quartz glass. Incubation was conducted in a sterile box under 1200 lux fluorescent lighting at 25° C. for 3 hours. The results are shown in Table 2. For comparison, a tile without a titanium oxide layer was also tested. Table 2 also shows the results of the comparative test.

TABLE 2

| | Staphylococcus aureus | Klebsiella pneumoniae |
|---|---|---|
| Number of cells dropped | 3100 | 1725 |
| Tile blank | 1230 | 1800 |
| Example 6 | 135 | 400 |
| Example 7 | 160 | 755 |
| Example 8 | 385 | 575 |
| Example 9 | 200 | 425 |
| Example 10 | 365 | 625 |
| Example 11 | 230 | 725 |
| Example 12 | 225 | 680 |

The cell number is expressed in terms of cell/ml.

Table 2 shows that the tiles of the invention had a high antibacterial activity against *Staphylococcus aureus* and *Klebsiella pneumoniae*.

Example 13

Ten grams of 375-mesh silica gel particles (mean particle size about 40 μm) were mixed with 1 liter of distilled water. The liquid was applied to the surface of a white tile (commercially available one, 97 mm×97 mm×5 mm (thickness)), using a gauze impregnated with the liquid. The tile was degreased by cleaning before application of the liquid.

The tile was pre-heated at 420° C. in an air stream within the furnace. Liquid titanium tetrachloride was bubbled with oxygen and the obtained vapor of titanium tetrachloride was deposited on the tile. Thereafter the same vapor deposition operation was repeated once (vapor deposition step). The vapor deposition including the pre-heating was completed in 80 seconds. After vapor deposition, the tile was sprayed with a water vapor.

Subsequently the coated tile was heat-treated at 500° C. for 3 minutes in an oxygen stream within the furnace to produce a tile having a coherent layer of titanium oxide (heat treatment step).

The obtained tile was tested for an antibacterial activity against *Escherichia coli* in the same manner as in Test Example 3. The irradiation time was 1 hour and the number of cells dropped on the tile was 18600 cells/ml.

The results showed that the number of cells on the non-processed tile was 10100 cells/ml, whereas the number of cells on the tile with the titanium oxide layer was reduced to 3850 cells/ml.

Example 14

A titanium oxide layer was formed around river sand particles.

River sand particles of about 1 to about 4 mm in particle size were washed with water, and immersed in the same silica-containing liquid as used in Example 1. The particles were heated in the same manner as in Example 1 at 500° C. for 7 minutes to form an undercoating. The operation of the same second step as in Example 1 with the exception of pre-heating at 500° C. was repeated twice. The particles were heat-treated in the same manner as in Example 1 to form a titanium oxide layer on their surface.

The coated sand particles were tested in the same manner as in Test Example 1 for the ability to reduce the NO concentration (using a Petri dish having a thickness of 3 mm). Nitrogen oxide was passed through the photocatalyst material in an initial concentration of 1.10 ppm (NO/air) and at a flow rate of 237 ml/min. The NO concentration after passage was reduced to 0.358 ppm and the NO conversion was 67.5%.

The same test as in Test Example 1 was repeated with the exception of exposure to sun light through a window glass (thickness of 1.5 mm). Nitrogen oxide was passed through the photocatalyst material in an initial concentration of 1.10 ppm (NO/air) and at a flow rate of 237 ml/min. The NO concentration after passage was reduced to 0.863 ppm and the NO conversion was 21.7%.

Example 15

A titanium oxide layer was formed around small glass balls.

Glass balls having a titanium oxide layer were produced from those of 5.0 mm in diameter in the same manner as in Example 14 with the exception of repeating 5 times the operation of the same second step as in Example 1.

The coated glass balls were tested for the ability to reduce the NO concentration (using a Petri dish having a thickness of 3 mm). Nitrogen oxide was passed through the photocatalyst material in an initial concentration of 1.10 ppm (NO/air) and at a flow rate of 237 ml/min. The NO concentration after passage was reduced to 0.151 ppm and the NO conversion was 66.2%.

Example 16

About 2.7 g of 375-mesh silica gel particles (mean particle size about 40 μm) were mixed with 1 liter of distilled water. The liquid was applied to the surface of a plate of borosilicate glass, using a gauze impregnated with the liquid. The plate was cleaned before application of the liquid to remove the oil and the like from its surface. The coated plate was placed into a furnace and heated at 350° C. for 2 minutes. Then a water vapor was sprayed for 5 seconds to form an undercoating (first step).

Thereafter the plate was pre-heated at 500° C. in an air stream within the furnace. Liquid titanium tetrachloride was bubbled with oxygen and the obtained vapor of titanium tetrachloride was deposited on the undercoating (second step). After vapor deposition, the plate was sprayed with a water vapor. The vapor deposition including the pre-heating (second step) was completed in 80 seconds. Then the second step was carried out once.

Finally the plate was heat-treated at 500° C. for 7 minutes in an oxygen stream within the furnace and further heat-treated under the same conditions (third step).

Figure 4:
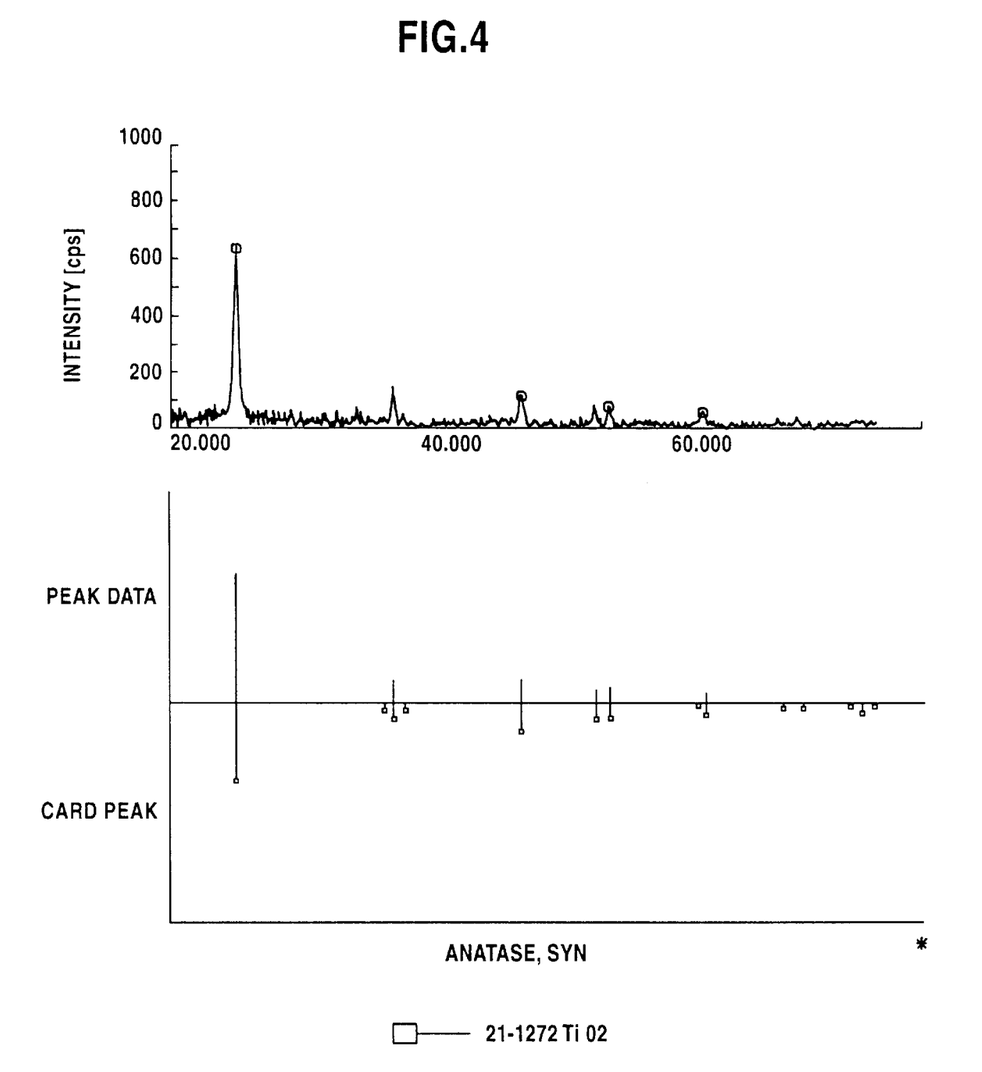
FIG. 4 is a chart showing the results of analyzing the titanium oxide layer obtained in Example 16 by X-ray diffraction.

Coherent streaks appeared on the surface of the plate thus obtained. The surface layer of the obtained plate was analyzed by X-ray diffraction. The analysis showed that the surface layer had an anatase-type crystalline structure as shown in FIG. 4, and showed strength of 635 cps at peaks in the neighborhood of 2 theta=25.2° which is typical of anatase-type crystalline structure.

Example 17

A plate with a coherent titanium oxide layer was produced in the same manner as in Example 16 with the exception of repeating the operation of the second step three times. The titanium oxide layer was analyzed by X-ray diffraction in the same manner as in Example 16. The analysis showed that the titanium oxide layer had an anatase-type crystalline structure, and showed strength of 635 cps at peaks in the neighborhood of 2θ=25.2° which is typical of anatase-type crystalline structure.

Example 18

Figure 5:
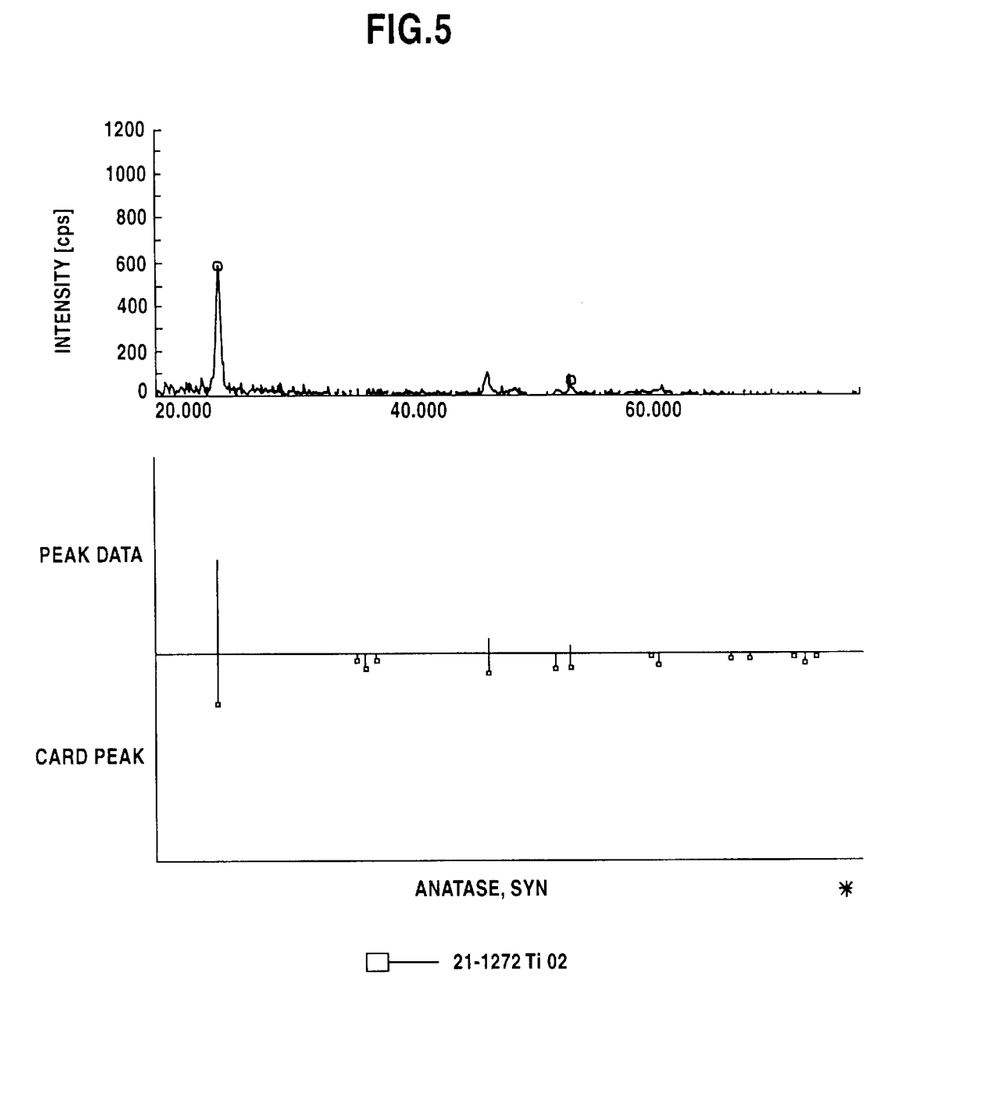
FIG. 5 is a chart showing the results of analyzing the titanium oxide layer obtained in Example 18 by X-ray diffraction.

A plate with a coherent titanium oxide layer was produced in the same manner as in Example 16 with the exception of repeating the operation of the first step three times with a 5-minute interval after each operation, and executing the second step once. The titanium oxide layer was analyzed by X-ray diffraction in the same manner as in Example 16. The analysis showed that the titanium oxide layer had an anatase-type crystalline structure as shown in FIG. 5, and exhibited strength of 595 cps was shown at peaks in the neighborhood of $2\nu=25.2°$ which is typical of anatase-type crystalline structure. The results show that an ideal anatase-type crystalline structure was formed although the second step (vapor deposition step) was conducted only once.

What we claim is:

1. A process for preparing a photocatalyst material, the process comprising a first step of forming an undercoating containing silica gel on a substrate, a second step of bringing titanium tetrachloride into contact with the undercoating and a third step of heat-treating the coated substrate.

2. The process according to claim 1, wherein the first step comprises coating the surface of the substrate with a mixture of silica gel and water and heat-treating the coated substrate to form a silica gel-containing undercoating.

3. The process according to claim 1, wherein the first step comprises coating the surface of the substrate with a solution of silica gel in water and heat-treating the coated substrate to form a silica gel-containing undercoating.

4. The process according to claim 1, wherein the heat treatment at the third step is effected in steam containing oxygen at a temperature of 150 to 500° C.

5. The process according to claim 1, wherein at least one of the first, second and third steps is carried out while supplying a water vapor.

6. The process according to claim 1, wherein at least one of the operations of the second and third steps is repeated at least once.

* * * * *